(12) United States Patent
Oz et al.

(10) Patent No.: US 9,524,751 B2
(45) Date of Patent: Dec. 20, 2016

(54) SEMI-AUTOMATIC GENERATION OF MULTIMEDIA CONTENT

(71) Applicant: Wochit, Inc., New York, NY (US)

(72) Inventors: Ran Oz, Maccabim (IL); Dror Ginzberg, Nir Zvi (IL); Amotz Hoshen, Tel-Aviv (IL); Ron Maayan, Tel Aviv (IL); Ran Yakir, Hod Hasharon (IL)

(73) Assignee: WOCHIT, INC., New York, NY (US)

( * ) Notice: Subject to any disclaimer, the term of this patent is extended or adjusted under 35 U.S.C. 154(b) by 0 days.

(21) Appl. No.: 14/839,988

(22) Filed: Aug. 30, 2015

(65) Prior Publication Data

US 2015/0371679 A1    Dec. 24, 2015

Related U.S. Application Data

(63) Continuation-in-part of application No. 14/170,621, filed on Feb. 2, 2014, which is a continuation-in-part of application No. 13/874,496, filed on May 1, 2013.

(60) Provisional application No. 61/640,748, filed on May 1, 2012, provisional application No. 61/697,833, filed on Sep. 7, 2012.

(51) Int. Cl.
| | | |
|---|---|---|
| *H04N 5/76* | (2006.01) | |
| *G11B 27/031* | (2006.01) | |
| *G10L 13/02* | (2013.01) | |
| *G06F 17/30* | (2006.01) | |
| *H04N 9/82* | (2006.01) | |
| *H04N 5/262* | (2006.01) | |
| *H04N 5/765* | (2006.01) | |

(52) U.S. Cl.
CPC ....... *G11B 27/031* (2013.01); *G06F 17/30823* (2013.01); *G10L 13/02* (2013.01); *H04N 5/262* (2013.01); *H04N 5/76* (2013.01); *H04N 9/8205* (2013.01); *H04N 9/8211* (2013.01); *H04N 5/765* (2013.01)

(58) Field of Classification Search
None
See application file for complete search history.

(56) References Cited

U.S. PATENT DOCUMENTS

| | | |
|---|---|---|
| 6,085,201 A | 7/2000 | Tso |
| 6,744,968 B1 | 6/2004 | Imai et al. |
| 2002/0003547 A1 | 1/2002 | Wang et al. |
| 2002/0042794 A1 | 4/2002 | Konaka |
| 2004/0111265 A1 | 6/2004 | Forbes |
| 2006/0041632 A1* | 2/2006 | Shah ............... G06F 17/30038 709/217 |

(Continued)

OTHER PUBLICATIONS

U.S. Appl. No. 13/874,496 Office Action dated Jan. 21, 2016.

(Continued)

*Primary Examiner* — Eileen Adams
(74) *Attorney, Agent, or Firm* — D. Kligler IP Services Ltd.

(57) ABSTRACT

A method for multimedia content generation includes presenting to a user text that will serve as audio narration in a video clip, and a collection of media items to be selectively included in the video clip. Instructions, which associate one or more selected media items with corresponding elements of the text, are received from the user. The video clip is generated automatically, such that the selected media items appear in the video clip in synchronization with the corresponding elements of the text in accordance with the instructions.

17 Claims, 4 Drawing Sheets

(56) References Cited

U.S. PATENT DOCUMENTS

| | | | |
|---|---|---|---|
| 2006/0149558 A1* | 7/2006 | Kahn | G10L 15/063 |
| | | | 704/278 |
| 2006/0212421 A1 | 9/2006 | Oyarce | |
| 2006/0274828 A1 | 12/2006 | Siemens et al. | |
| 2006/0277472 A1 | 12/2006 | Yodo et al. | |
| 2007/0244702 A1 | 10/2007 | Kahn et al. | |
| 2008/0033983 A1 | 2/2008 | Ko | |
| 2008/0104246 A1 | 5/2008 | Katz et al. | |
| 2008/0270139 A1 | 10/2008 | Shi | |
| 2008/0281783 A1 | 11/2008 | Papkoff et al. | |
| 2009/0169168 A1 | 7/2009 | Ishikawa | |
| 2010/0061695 A1 | 3/2010 | Furmanski et al. | |
| 2010/0153520 A1 | 6/2010 | Daun et al. | |
| 2010/0180218 A1 | 7/2010 | Boston et al. | |
| 2010/0191682 A1 | 7/2010 | Takamatsu | |
| 2011/0109539 A1* | 5/2011 | Wu | G06F 3/011 |
| | | | 345/156 |
| 2011/0115799 A1 | 5/2011 | Imbruce | |
| 2013/0294746 A1 | 11/2013 | Oz et al. | |
| 2014/0147095 A1 | 5/2014 | Oz et al. | |
| 2015/0081696 A1 | 3/2015 | Ogawa | |

OTHER PUBLICATIONS

U.S. Appl. No. 14/170,621 Office Action dated Dec. 8, 2015.
U.S. Appl. No. 13/874,496 Office Action dated Jul. 7, 2015.
Zisman et at., U.S. Appl. No. 14/214,964 dated Mar. 16, 2014.
Lavi et al., U.S. Appl. No. 14/624,593 dated Feb. 18, 2015.
U.S. Appl. No. 14/214,964 Office Action dated Jul. 14, 2016.
U.S. Appl. No. 13/874,496 Office Action dated Jul. 15, 2016.

* cited by examiner

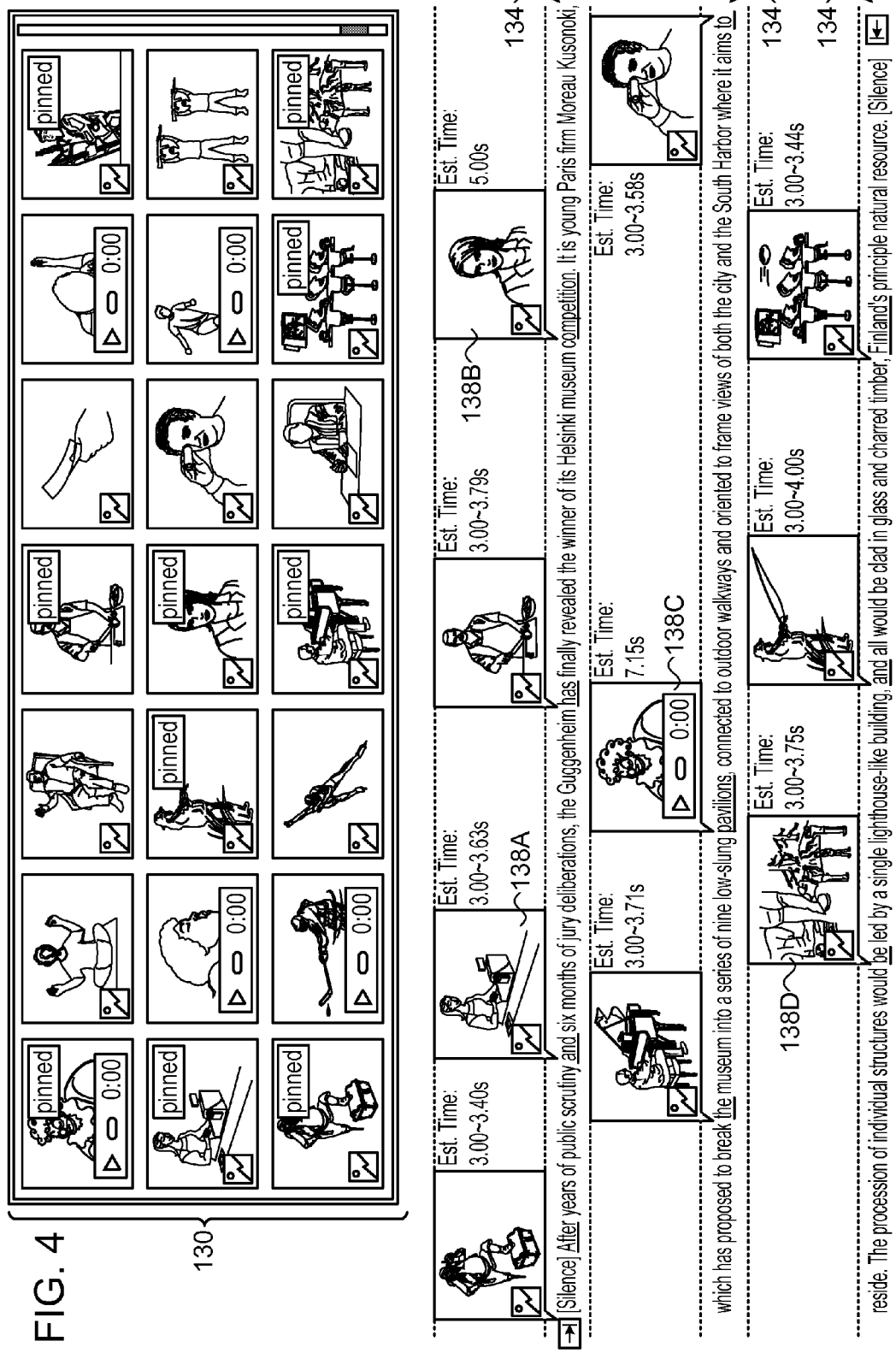

SEMI-AUTOMATIC GENERATION OF MULTIMEDIA CONTENT

CROSS-REFERENCE TO RELATED APPLICATIONS

This application is continuation in part of U.S. patent application Ser. No. 14/170,621, filed Feb. 2, 2014, which is a continuation in part of U.S. patent application Ser. No. 13/874,496, filed May 1, 2013, which claims the benefit of U.S. Provisional Patent Application 61/640,748, filed May 1, 2012, and U.S. Provisional Patent Application 61/697,833, filed Sep. 7, 2012. The disclosures of all these related applications are incorporated herein by reference.

FIELD OF THE INVENTION

The present invention relates generally to multimedia generation, and particularly to methods and systems for semi-automatic generation of multimedia content.

SUMMARY OF THE INVENTION

An embodiment of the present invention that is described herein provides a method for multimedia content generation, including presenting to a user text that will serve as audio narration in a video clip, and a collection of media items to be selectively included in the video clip. Instructions, which associate one or more selected media items with corresponding elements of the text, are received from the user. The video clip is generated automatically, such that the selected media items appear in the video clip in synchronization with the corresponding elements of the text in accordance with the instructions.

In some embodiments, presenting the text includes laying the text on a timeline, and receiving the instructions includes enabling the user to position the selected media items on the timeline in proximity to the corresponding elements of the text. In an embodiment, the instructions received from the user associate each selected media item with a respective element of the text selected from a group of elements consisting of a word, a part of a word, a space between words and a punctuation mark.

In some embodiments, automatically generating the video clip includes estimating respective times at which the elements of the text will appear in the audio narration in the video clip, and inserting the corresponding media items into the video clip at the estimated times. In an embodiment, the method further includes estimating, based on the estimated times, durations for which the selected media items will appear in the video clip, and presenting the estimated durations to the user.

In some embodiments, presenting the text and receiving the instructions include interacting with the user over a screen of a mobile communication device. Interacting with the user may include displaying a portion of the text with a corresponding subset of the media items on the screen, and, in response to input from the user, scrolling to display a different portion of the text and a different subset of the media items. Additionally or alternatively, interacting with the user may include displaying on the screen a portion of the text and a corresponding subset of the media items that span a given time duration, and, in response to input from the user, zooming to display a different portion of the text and a different subset of the media items that span a different time duration.

There is additionally provided, in accordance with an embodiment of the present invention, apparatus for multimedia content generation, including a user terminal and a processor. The user terminal is configured to present to a user a text that will serve as audio narration in a video clip, to further present to the user a collection of media items to be selectively included in the video clip, and to receive from the user instructions, which associate one or more selected media items with corresponding elements of the text. The processor is configured to automatically generate the video clip, such that the selected media items appear in the video clip in synchronization with the corresponding elements of the text in accordance with the instructions.

There is further provided, in accordance with an embodiment of the present invention, a computer software product, the product including a tangible non-transitory computer-readable medium in which program instructions are stored, which instructions, when read by a processor, cause the processor to present to a user a text that will serve as audio narration in a video clip, to further present to the user collection of media items to be selectively included in the video clip, to receive from the user instructions, which associate one or more selected media items with corresponding elements of the text, and to automatically generate the video clip, such that the selected media items appear in the video clip in synchronization with the corresponding elements of the text in accordance with the instructions.

The present invention will be more fully understood from the following detailed description of the embodiments thereof, taken together with the drawings in which:

BRIEF DESCRIPTION OF THE DRAWINGS

FIG. 4 is a schematic illustration of a Graphical User Interface (GUI) used for semi-automatic generation of video clips, in accordance with an embodiment of the present invention.

DETAILED DESCRIPTION OF EMBODIMENTS

Overview

Figure 1:
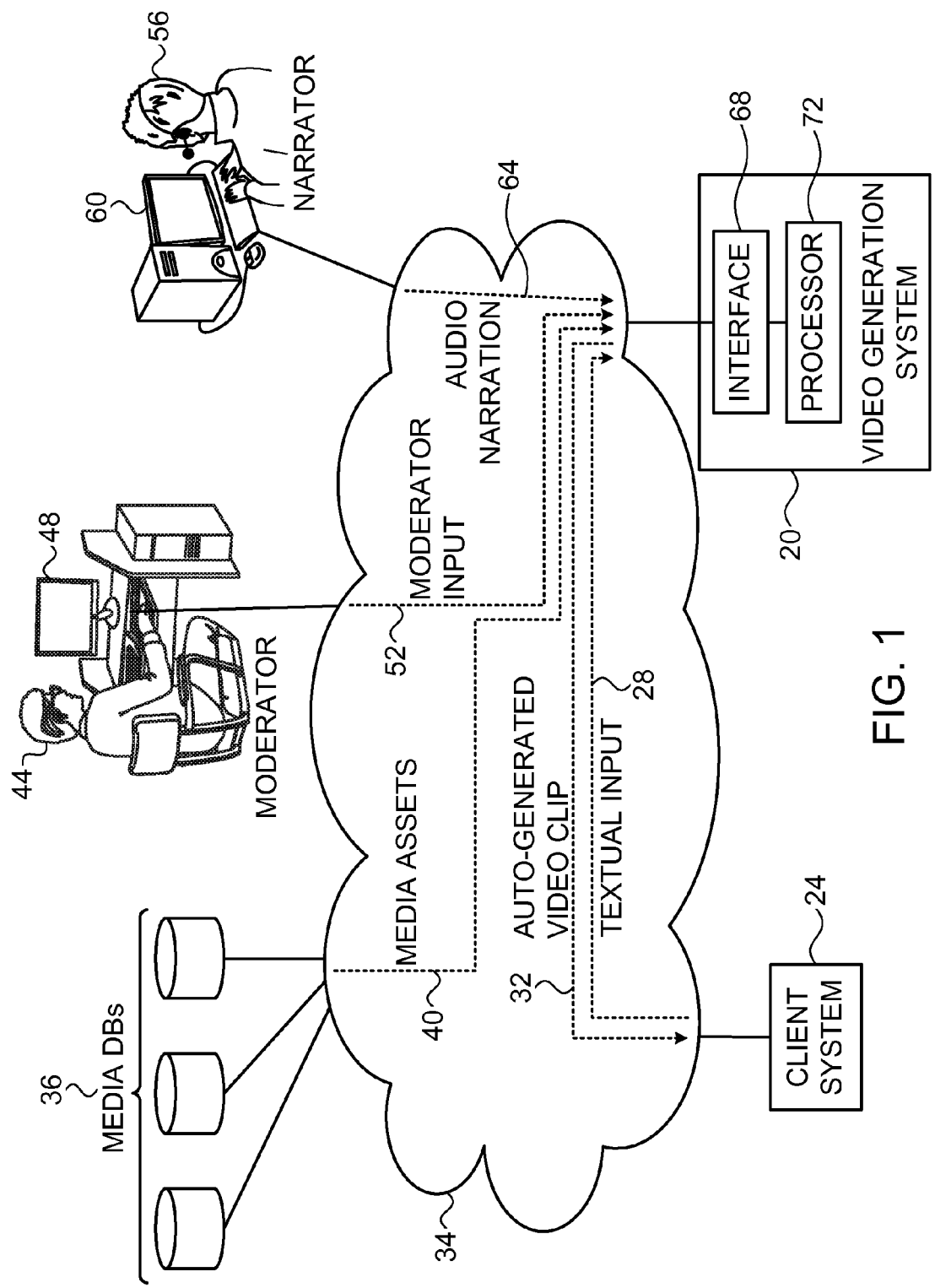
FIG. 1 is a block diagram that schematically illustrates a system for semi-automatic generation of video clips, in accordance with an embodiment of the present invention.

Embodiments of the present invention that are described herein provide improved methods and systems for generating multimedia content. In the disclosed embodiments, a video generation system receives textual input for which a video clip is to be generated. The textual input may comprise, for example, a short article relating to entertainment, business, technology, general news or other topic. The system generates a video clip based on the textual input using a semi-automatic, human-assisted process that is described in detail below.

The video clip generation process is mostly automatic, and reverts to human involvement only where human input has the strongest impact on the quality of the video clip. As a result, the time and cost of generating video clips are reduced to a minimum, while still producing highly professional clips. Moreover, the disclosed techniques generate video clips virtually in real time, shortening the turnaround time needed for presenting breaking news to end users.

In some embodiments, the video generation system analyzes the textual input, for example using contextual analysis algorithms, so as to extract descriptive metadata. The system queries various media databases using the extracted metadata, so as to retrieve media assets that are likely to be related to the textual input. Media assets may comprise, for example, video and audio excerpts, still images, Web-page snapshots, maps, graphs, graphics elements, social network information, and many others. The system ranks and filters the media assets according to their relevance to the textual input, and presents the resulting collection of media assets to a human moderator.

The task of the moderator is largely editorial. The moderator typically selects media assets that will appear in the video clip, and correlates one or more of them in time with the textual input. In some embodiments, the presentation times of at least some media assets are set automatically by the system.

In some embodiments, audio narration of the textual input is not yet available at the moderation stage, and the moderator uses an estimation of the audio timing that is calculated by the system. The system thus receives from the moderator input, which comprises the selected media assets and their correlation with the textual input. Moderation typically requires no more than several minutes per video clip.

Following the moderation stage, the video generation process is again fully-automatic. The system typically receives audio narration of the textual input. (The audio narration is typically produced by a human narrator after the moderation stage, and possibly reviewed for quality by the moderator.) The system generates the video clip using the audio narration and the selected media assets in accordance with the moderator input. The system may include in the video clip additional elements, such as background music and graphical theme. The video clip is then provided as output, optionally following final quality verification by a human.

As noted above, the methods and systems described herein considerably reduce the time and cost of producing video clips. In some embodiments, the disclosed techniques are employed on a massive scale, for converting a large volume of textual articles into video clips using a shared pool of moderators and narrators.

System Description

FIG. 1 is a block diagram that schematically illustrates a system 20 for semi-automatic generation of video clips, in accordance with an embodiment of the present invention. System 20 receives textual inputs 28 and generates respective video clips 32 based on the textual inputs. The textual inputs may comprise, for example, articles relating to entertainment, business, technology, general news or any other suitable topics.

In the example of FIG. 1, system 20 receives the textual inputs from a client system 24, and returns the video clips to the client system. A video generation system of this sort may be used, for example, for providing a publisher with video clips based on textual articles received from the publisher. System 20 communicates with client system 24 over a communication network 34, e.g., the Internet. In alternative embodiments, however, system 20 may obtain textual inputs from any other suitable source and deliver video clips to any other suitable destination. System 20 can thus be used in a variety of business models and modes of operation.

The details of the video generation process performed by system 20 will be explained in detail below. Generally, system 20 communicates over network 34 with one or more media databases (DBs) 36 so as to retrieve media assets 40 that are related to the textual input. The media assets are also referred to as media items, and may comprise, for example, video and/or audio excerpts, still images, Web-page snapshots, maps, graphs, graphical elements, social network information, and many others. Media DBs 36 may comprise, for example, content Web sites, social network servers or any other suitable database.

System 20 presents the textual input and the corresponding automatically-retrieved media assets to a human moderator 44 using a moderator terminal 48. The figure shows a single moderator for the sake of clarity. A real-life system, however, will typically use multiple moderators for handling multiple textual inputs and video clips simultaneously. Moderator 48 reviews and selects media assets that will be included in the video clip, and arranges the media assets so as to correlate in time to the timing of the textual input. The moderator thus produces moderator input 52, which is fed back to system 20 over network 34.

In addition to moderator input 52, system 20 further receives audio narration 64 of the textual input in question. The audio narration is produced by a narrator 56 using a narrator terminal 60 and provided to system 20 over network 34. Although the figure shows a single narrator for the sake of clarity, a real-life system will typically use multiple narrators. Based on moderator input 52 and audio narration 64, system 20 automatically produces video clip 32. Video clip 32 is delivered over network 34 to client system 24. In some embodiments, the automatically-generated video clip is verified by moderator 44 before delivery to client system 24. Audio narration 64 is also optionally verified for quality by moderator 44.

In the example of FIG. 1, system 20 comprises an interface 68 for communicating over network 34, and a processor 72 that carries out the methods described herein. The system configuration shown in FIG. 1 is an example configuration, which is chosen purely for the sake of conceptual clarity. In alternative embodiments, any other suitable system configuration can be used.

The elements of system 20 may be implemented using hardware/firmware, such as in an Application-Specific Integrated Circuit (ASIC) or Field-Programmable Gate Array (FPGA), using software, or using a combination of hardware/firmware and software elements. In some embodiments, processor 72 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Hybrid Semi-Automatic Video Clip Generation

In various industries it is becoming increasingly important to generate video clips with low cost and short turnaround time. For example, news Web sites increasingly prefer to present breaking news and other stories using video rather than text and still images. Brands may wish to post on their Web sites video clips that are relevant to their products. Publishers, such as entertainment Web sites, may wish to publish topic-centered video clips. Multi-Channel Networks (MCNs) may wish to create video clips in a cost-effective way for blog content.

System 20 generates video clips using a unique division of labor between computerized algorithms and human moderation. The vast majority of the process is automatic, and moderator 44 is involved only where absolutely necessary and most valuable. As a result, system 20 is able to produce large volumes of high-quality video clips with low cost and short turnaround time.

Figure 2:
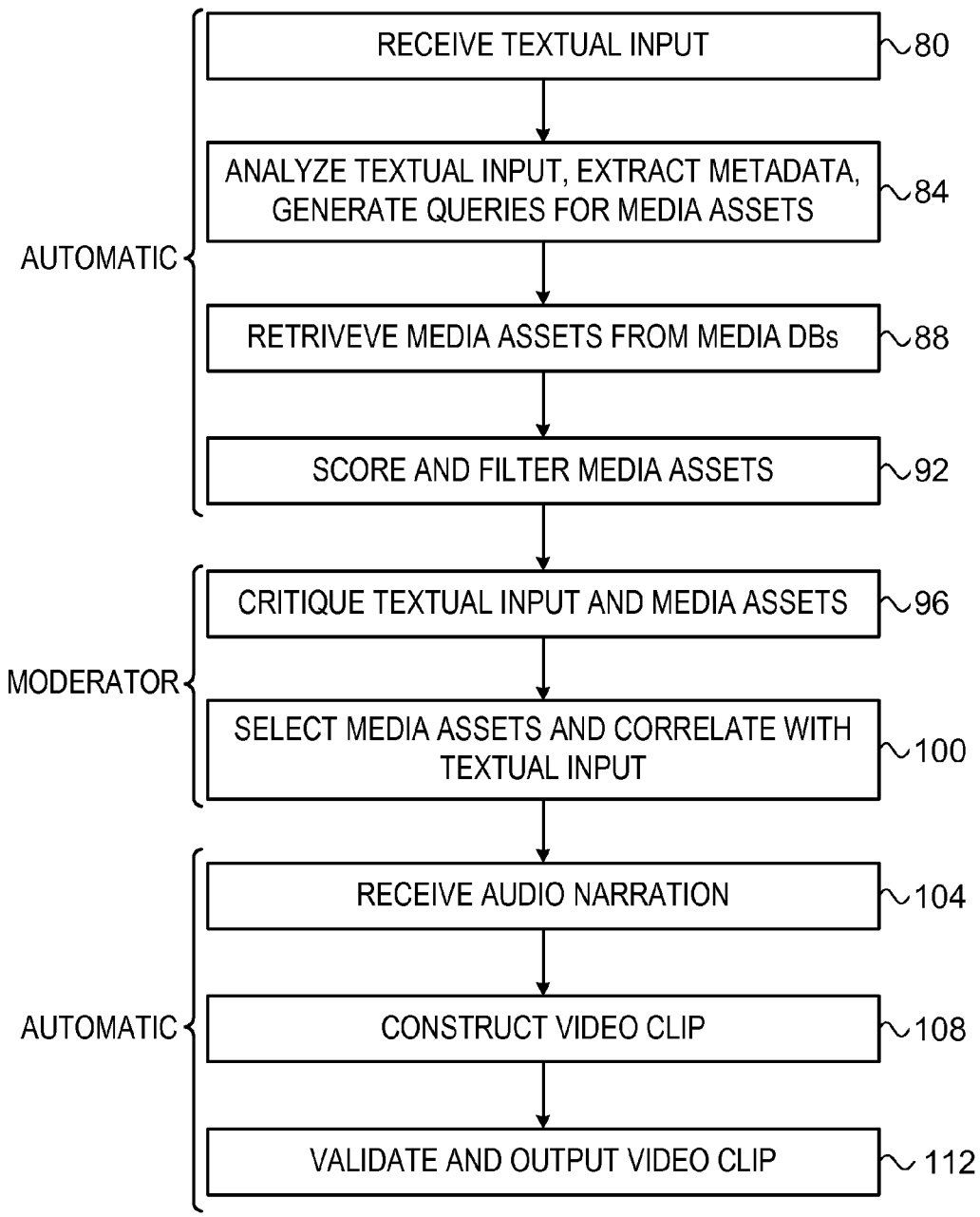
FIG. 2 is a flow chart that schematically illustrates a method for semi-automatic generation of video clips, in accordance with an embodiment of the present invention.

FIG. 2 is a flow chart that schematically illustrates a method for semi-automatic generation of a video clip, in accordance with an embodiment of the present invention. The method begins with processor 72 of system 20 receiving textual input 28 via interface 68, at an input step 80. The textual input, typically a short article, may be provided by client system 24 (as in the example of FIG. 1), obtained by system 20 on its own initiative, or provided to system 20 in any other way.

Processor 72 analyzes the textual input, at an input processing step 84. Typically, processor 72 applies contextual analysis to the textual input so as to extract metadata that is descriptive of the subject matter and content of the article in question. Using the extracted metadata, processor 72 generates one or more search queries for querying media databases 36. In some embodiments, processor 72 summarizes the textual input, e.g., to a certain target length, and then performs contextual analysis and query generation on the summarized article.

At a data retrieval step 88, system 20 queries media databases 36 over network 34 using the automatically-generated search queries, so as to retrieve media assets 40. The media assets may comprise any suitable kind of media items, such as video excerpts, audio excerpts, still images, Web-page snapshots, maps, graphs, graphics elements and social network information.

The retrieved media assets are all likely to be relevant to the textual input, since they were retrieved in response to search queries derived from the textual input. Nevertheless, the level of relevance may vary. Processor 72 assigns relevance scores to the media assets and filters the media assets based on the scores, at a filtering step 92. The filtering operation typically comprises discarding media assets whose score falls below a certain relevance threshold.

When processing video assets, processor 72 may assign relevance scores to specific parts of a video asset, not only to the video asset as a whole. For example, the video asset may be previously tagged by moderators to identify portions of interest, or it may comprise a time-aligned transcript of the video that enables processor 72 to identify portions of interest.

The output of step 92 is a selected collection of ranked media assets, which are considered most relevant to the textual input. System 20 presents this output to moderator 44 over network 34 using terminal 48. At this stage human moderation begins.

In an embodiment, moderator 44 initially critiques the textual input and the selected media assets, at a verification step 96. In an embodiment, the moderator verifies whether the textual input indeed answers the editorial needs of the system. For example, the moderator may verify whether the article content is interesting enough to justify generation of a video clip. The moderator may validate and optionally edit the textual input before it is provided to narrator 56 for narration.

Additionally or alternatively, moderator 44 may proactively search for additional media assets that were not retrieved automatically by system 20, and add such media assets to the collection. The moderator may also validate the article topics that were suggested by the system, and fix them if necessary. In an embodiment, moderator 44 rates the media assets that were suggested by system 20. The rating can be used to train the system, improve its enrichment mechanisms, and enhance the automatic asset retrieval process. Further additionally or alternatively, the moderator may critique and/or modify the textual input and/or the automatically-selected media assets in any other suitable way.

The moderator selects the media assets that will actually be included in the video clip and correlates them with the textual input, at an asset configuration step 100. Typically, system 20 estimates the expected duration of voice narration of the textual input (even though the actual narration is not available at this stage), and indicates the expected duration to the moderator. This indication helps the moderator determine the number and types of media assets he should select.

If the total duration of the media assets chosen by the moderator is smaller than the expected duration of the narration, system 20 may abort the process altogether, or attempt to find additional media assets (possibly assets that have been filtered-out at step 92).

Moderator 44 may perform additional filtering of the media assets, on top of the filtering performed by processor 72, based on editorial considerations. For example, the moderator may prefer media assets that are likely to be more attractive to the client. Within video assets, the moderator may mark particular segments to be included in the video clip, e.g., specific phrases or sentences from a long speech.

When a video asset comprises an audio soundtrack, the moderator may configure the use of this audio in the video clip. For example, the moderator may decide to use the original audio from the video asset as foreground audio or as background audio in the video clip, or discard the original audio and use only the video content of the video asset.

In an embodiment, the moderator indicates that a specific media asset is to be synchronized with a specific component of the textual input, e.g., with a specific word. This indication will later be used by processor 72 when scheduling the media assets in the final video clip.

Additionally or alternatively, moderator 44 may configure the media assets to be included in the video clip in any other suitable way. The output of the human moderation stage is referred to herein as "moderator input" (denoted 52 in FIG. 1) or "user input" that is fed back to system 20 over network 34.

At a narration input step 104, system 20 receives audio narration 64 of the textual input from narrator 56. The narrator may divide the textual input into segments, and narrate each segment as a separate task. In embodiment of FIG. 2, the audio narration is received after the moderation stage. In alternative embodiments, however, the audio narration may be received and stored in system 20 at any stage, before generation of the final video clip.

In some embodiments, system 20 processes the audio narration in order to improve the audio quality. For example, the system may automatically remove silence periods from the beginning and end of the audio narration, and/or perform audio normalization to set the audio at a desired gain. In some embodiments, moderator 44 reviews the quality of the audio narration. The moderator may approve the narration or request the narration to be repeated, e.g., in case of mistakes, intolerable audio quality such as background noise, wrong pronunciation, or for any other reason.

At this stage, processor 72 automatically constructs the final video clip, at a clip generation step 108. Processor 72 generates the video clip based on the moderator input, the audio narration, and the media assets selected and configured by the moderator. Processor 72 may use a video template, e.g., a template that is associated with the specific client. The final video clip generation stage is elaborated below.

In an embodiment, moderator 44 validates the final video clip, at a final validation step 112. The moderator may discard the video clip altogether, e.g., if the quality of the video clip is inadequate. After validation, the video clip is provided to client system 24. The flow of operations shown in FIG. 2 is depicted purely by way of example. In alternative embodiments, any other suitable flow can be used.

In some embodiments, processor 72 constructs the final video clip by scheduling the selected media assets over a timeline that is correlated with the audio narration. Scheduling of the media assets is performed while considering the constraints given by the moderator (step 100 of FIG. 2) with regard to synchronization of media assets to words or other components of the narrated text.

In some embodiments, processor 72 produces a timing estimate for the narration. The timing estimate gives the estimated occurrence time of each word (or other component) in the audio narration. In some embodiments processor 72 derives the timing estimate from the textual input, independently of the actual audio narration. In many cases, the timing estimate is produced before the audio narration is available. Processor 72 may use any suitable process for producing the timing estimate from the textual input. An example process is detailed in U.S. patent application Ser. No. 13/874,496, cited above. In other embodiments, the audio narration is already available to processor 72 when producing the timing estimate. In these embodiments the processor may derive the timing estimate from the audio narration rather than from the textual input. The output of this estimation process is narrated text with time markers that indicate the timing of each word or other component.

In some embodiments, processor 72 divides the narrated text into segments. The borders of each segment are either the start or end points of the entire narrated text, or the estimated timing of media segments that include foreground audio (e.g., video assets that will be displayed in the final video clip with the original audio and without simultaneous narration). Processor 72 then schedules media assets separately within each segment.

Figure 3:
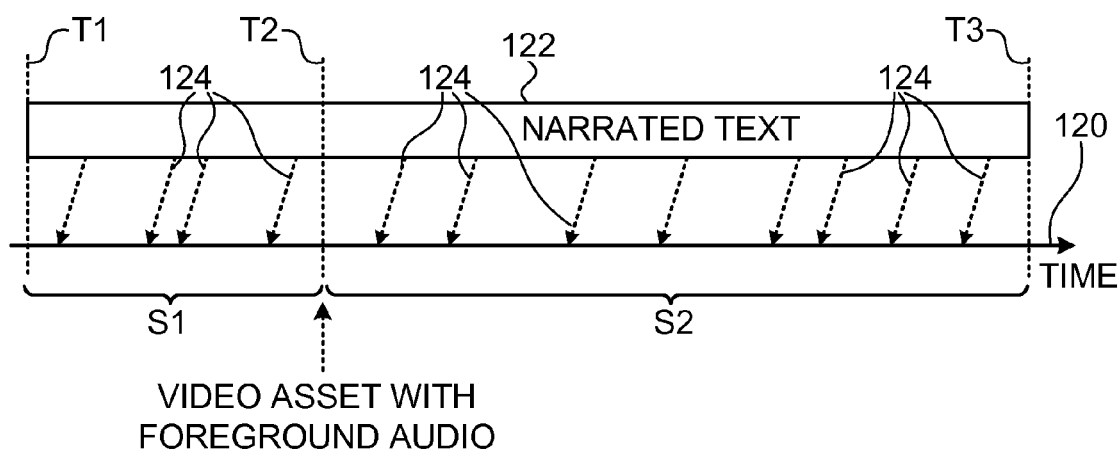
FIG. 3 is a diagram that schematically illustrates a process of automatic timeline generation, in accordance with an embodiment of the present invention.

FIG. 3 is a diagram that schematically illustrates the automatic timeline generation process, in accordance with an embodiment of the present invention. The figure shows a timeline 120 that corresponds to narrated text 122. Multiple markers 124 mark the occurrence times of respective words of the narrated text on the timeline.

In the present example, the moderator instructed that a video asset is to be synchronized to a particular word, and therefore occur at a time T2 on the timeline. (Times T1 and T2 mark the beginning and end of the entire narrated text, respectively.) The moderator has also decided that the original audio track of this video asset will be used as foreground audio in the final video clip. Therefore, there is no narration track to be played during the playing time of this video asset.

In this example, processor 72 divides the narrated text into two segments denoted S1=[T1,T2] and S2=[T2,T3]. The video asset in question is scheduled to appear between the two segments. Within each segment, processor schedules the media assets that will appear in the segment.

Typically, each type of media asset has a minimal and a maximal allowed duration, and therefore not all combinations of media assets can be scheduled in each segment. For example, if the duration of segment S1 is estimated to be four seconds, and the minimal duration of a still-image asset is configured to be two seconds, then no more than two still images can be schedule in this segment.

In some embodiments, processor 72 selects media assets for each segment by calculating multiple possible permutations of media asset scheduling, and assigning each permutation a score. The score of a permutation is typically assigned based on factors such as:

The relevance of a specific media asset to the segment in which it is placed. Processor 72 may assess this relevance, for example, by comparing the contextual metadata of the media asset to the narrated text in the segment.

The success of keeping media assets as close as possible to their desired appearance time as instructed by moderator 44.

The proportion of video media assets vs. still media assets (still images, maps and other still objects).

The proportion of video assets containing original sound.

The overlap between the narrated text and the visual assets (attempting to minimize time in which there is no voice-over in parallel to displaying a visual asset).

The rating that was given by the moderator.

Additionally or alternatively, processor 72 may use any other suitable criteria for calculating the scores of the various scheduling permutations.

For a given segment, processor 72 schedules the media assets in accordance with the permutation having the best score. In some embodiments, processor 72 also schedules video template components, such as visual effects and transitions between successive media assets.

In some embodiments, processor 72 applies a supervised learning algorithm to perform the automatic media asset scheduling (i.e., automatic timeline generation) process. The features for training such a model can be derived from the contextual metadata of the article and the narrated text. The target feature, i.e., examples of correct and/or incorrect placement of a media asset in a given segment, can be derived from feedback of moderator 44. In the training stage the scheduling process is assisted by the moderator. After training, processor 72 can generate the timeline in a fully automatic manner based on the trained model.

In various embodiments, processor 72 may schedule the audio in the video clip in different ways. For example, processor 72 may choose background music for the video clip depending on the contextual sentiment of the textual input, possibly in conjunction with predefined templates. Processor 72 typically receives as input a list of audio tracks: The audio narration of the textual input, the background track or tracks, effects for transition between media assets, raw audio of the media assets (e.g., original audio that is part of a video asset). Processor 72 adds the audio tracks to the timeline, including transitions between the different audio tracks. Transition rules between audio tracks are typically applied based on the applicable template, e.g., by performing cross-fade between different tracks.

Processor 72 typically performs video rendering based on the selected visual assets (e.g., template related visual objects, video assets, still images, maps, Web pages and transitions) and audio assets (e.g., audio narration, background music, effects and natural sounds from video assets) according to the generated time line. Rendering may also be performed automatically using an Application Programming Interface (API) to a suitable rendering module. An optional manual validation step may follow the rendering process.

FIG. 4 is a schematic illustration of a Graphical User Interface (GUI) used for semi-automatic generation of video clips, in accordance with an embodiment of the present invention. This GUI may be implemented on a suitable user terminal, e.g., moderator terminal 48 of moderator 44. The description that follows refers mainly to the system configuration of FIG. 1.

Term "user," however, may refer to moderator 44 or to any other user. An alternative system configuration, in which the user is a personal user who generates video clips using a mobile application on a mobile communication device, is addressed further below.

The user terminal of FIG. 4 enables the user (e.g., moderator 44) to select media assets to be included in the video clip, and to synchronize them with specific elements of the textual input. These actions correspond, for example, to step 100 FIG. 2 above. The specific GUI features of FIG. 4 are shown purely by way of example, and any other suitable GUI features can be used for this purpose.

As explained above, system 20 generates the video clip on the basis of textual input (referred to below simply as "text"). At some stage of the process, the text is narrated, and this narration is inserted as audio in the clip. In the present example, the text or a portion thereof is displayed on a timeline 134 at the bottom of the screen.

A window 130 at the top of the screen displays the collection of media assets that were retrieved by system 20 based on the text. These media assets may comprise, for example, still images, video and audio excerpts, Web-page snapshots, maps, graphs, graphics elements, social network information, and many others.

The user terminal GUI enables the user to select a media asset, and associate the selected media asset with a desired element of the text. In the present example, the user is able to select a media asset in window 130, and drag-and-drop the media asset at a desired position on timeline 134. By positioning a media asset above a certain element of the text, the user instructs system 20 to associate (and time-synchronize) the media asset and the text element.

Processor 72 generates the video clip in accordance with these instructions, i.e., inserts each media asset into the video clip in synchronization with the corresponding element of the text.

For example, an image 138A has been dragged-and-dropped by the user above the word "and" of the text. By performing this action, the user instructs system 20 that image 138A should be displayed at the time the word "and" is played in the audio narration. Similarly, an image 138B has been placed by the user over the word "competition" of the text. A video excerpt 138C has been placed over the word "pavilions," and an image 138D has been placed over the word "be." The GUI typically underlines, or otherwise marks, the text element with which the media asset is associated.

Using the user terminal GUI, the user may associate each media asset with various types of text elements, such as, for example, with a word, a part of a word, a space between words, a punctuation mark, or any other suitable element of the text. The association instructs system 20 to synchronize the appearance of the media asset with the narration of the corresponding text element in the video clip.

In some embodiments, processor 72 of system 20 estimates the timing of the audio narration based on the input text. In other words, processor 72 estimates the respective times at which the text elements (e.g., words, parts of words, spaces or punctuation marks) will appear in the audio narration and thus in the video clip. Based on this time estimation, processor 72 is able to estimate and present to the user various timing figures relating to the selected media assets.

In one example embodiment, processor 72 estimates and displays the time duration for which a given image will appear in the video clip. For example, image 138A is estimated to appear for a duration of 3.00-3.63 seconds in the video clip. Processor 72 typically estimates this time duration by assuming that image 138A will first appear in the clip when the word "and" is played, and will be displayed until the word "has" is played (at which time the next image has to be inserted). Thus, the presentation duration of image 138A is therefore the time difference between playing of the words "and" and "has" in the audio narration.

Unlike still images, the time duration of video excerpts is predefined. Except 138C, for example, will appear for a duration of 7.15 seconds in the video clip. In some embodiments, when the user attempts to place a video excerpt on the timeline, the GUI may verify that the predefined duration of the excerpt does not overlap another media asset that has already been placed on the timeline. If an overlap is found, the GUI may prevent the excerpt from being dropped at the attempted position, and/or prompt the user.

In some embodiments, the user terminal marks the media assets in window 130 that have already been selected and positioned on timeline 134. In the present example, previously selected media assets are labeled "pinned" in window 130. This marking prevents the user from unintentionally selecting the same media asset more than once in the same video clip.

The configuration of FIG. 1 above refers mainly to a system that produces a mass of video clips using multiple moderators and narrators for various client systems. In alternative embodiments, the disclosed techniques can be implemented in a mobile communication device environment, for allowing a personal user to generate video clips for his own use of for sharing with others.

In such embodiments, the same personal user typically plays the roles of both the moderator and the narrator. The functionality of the user terminal is typically carried out by an application running on the user's mobile device, e.g., smart-phone or tablet computer. The application interacts with the user using the available input and output devices, e.g., a touch-sensitive screen of the device. The functionality of processor 72 may be carried out in the mobile device, or in a server with which the mobile device communicates.

In some embodiments, a variant of the user terminal GUI is implemented using the touch-sensitive screen of the mobile device. Typically, however, the mobile device screen is considerably smaller than the screen of a desktop terminal, and therefore the GUI typically differs from that of FIG. 4.

For example, in some embodiments, the user terminal (mobile application in this example) displays only a portion of the timeline with the corresponding media assets at any given time. By interacting with the touch-sensitive screen, the GUI enables the user to scroll forward and backward along the timeline.

As another example, the user terminal may enable the user to zoom-in and zoom-out using simple gestures, so as to increase or decrease the time duration of the displayed portion of the timeline. Zooming-out enables the user, for example, to view the entire timeline and scroll to times of interest. Zooming-in enables the user, for example, to place media assets on the timeline and correlate them with text elements with high precision.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for multimedia content generation, comprising:
    receiving, by a processor, from a user, a text that will serve as audio narration in a video clip;
    automatically collecting, from one or more databases, responsive to the received text that will serve as audio narration in the video clip, a collection of media items to be selectively included in the video clip;
    presenting to the user, on a graphic user interface (GUI), the received text that will serve as audio narration in the video clip and the collection of media items to be selectively included in the video clip;
    receiving from the user, through the GUI, instructions, which associate one or more selected media items from the automatically collected collection of media items, with corresponding elements of the received text; and
    automatically generating the video clip, such that the selected media items appear in the video clip in the order of the corresponding elements in the received text and in synchronization with the corresponding elements of the received text in accordance with the instructions, which associate the one or more selected media items with corresponding elements of the received text.

2. The method according to claim 1, wherein presenting the text comprises laying the text on a timeline presented by the GUI, and wherein receiving the instructions comprises enabling the user to position the selected media items on the timeline in proximity to the corresponding elements of the text.

3. The method according to claim 1, wherein the instructions received from the user associate each selected media item with a respective element of the text selected from a group of elements consisting of a word, a part of a word, a space between words and a punctuation mark.

4. The method according to claim 1, wherein automatically generating the video clip comprises estimating respective times at which the elements of the text will appear in the audio narration in the video clip, and inserting the corresponding media items into the video clip at the estimated times.

5. The method according to claim 4, and comprising estimating, based on the estimated times, durations for which the selected media items will appear in the video clip, and presenting the estimated durations to the user.

6. The method according to claim 1, wherein presenting the text and receiving the instructions comprise interacting with the user over a screen of a mobile communication device.

7. The method according to claim 6, wherein interacting with the user comprises displaying a portion of the text with a corresponding subset of the media items on the screen, and, in response to input from the user, scrolling to display a different portion of the text and a different subset of the media items.

8. The method according to claim 6, wherein interacting with the user comprises displaying on the screen a portion of the text and a corresponding subset of the media items that span a given time duration, and, in response to input from the user, zooming to display a different portion of the text and a different subset of the media items that span a different time duration.

9. An apparatus for multimedia content generation, comprising:
    a user terminal including a screen, which is configured to receive from a user, a text that will serve as audio narration in a video clip, to automatically collect from one or more databases, responsive to the received text that will serve as audio narration in the video clip, a collection of media items to be selectively included in the video clip, to present to the user, on the screen, in a graphic user interface (GUI), the received text that will serve as audio narration in the video clip and the collection of media items and to receive from the user, through the GUI, instructions, which associate one or more selected media items from the automatically collected collection of media items, with corresponding elements of the received text; and
    a processor, which is configured to automatically generate the video clip, such that the selected media items appear in the video clip in the order of the corresponding elements in the received text and in synchronization with the corresponding elements of the received text in accordance with the instructions, which associate the one or more selected media items with corresponding elements of the received text.

10. The apparatus according to claim 9, wherein the user terminal is configured to lay the text on a timeline presented by the GUI, and to receive the instructions by enabling the user to position the selected media items on the timeline in proximity to the corresponding elements of the text.

11. The apparatus according to claim 9, wherein the instructions received from the user associate each selected media item with a respective element of the text selected from a group of elements consisting of a word, a part of a word, a space between words and a punctuation mark.

12. The apparatus according to claim 9, wherein the processor is configured to estimate respective times at which the elements of the text will appear in the audio narration in the video clip, and to insert the corresponding media items into the video clip at the estimated times.

13. The apparatus according to claim 12, wherein the processor is configured to estimate, based on the estimated times, durations for which the selected media items will appear in the video clip, and wherein the user terminal is configured to present the estimated durations to the user.

14. The apparatus according to claim 9, wherein the user terminal is configured to present the text and receive the instructions by interacting with the user over a screen of a mobile communication device.

15. The apparatus according to claim 14, wherein the user terminal is configured to display a portion of the text with a corresponding subset of the media items on the screen, and, in response to input from the user, to scroll to display a different portion of the text and a different subset of the media items.

16. The apparatus according to claim 14, wherein the user terminal is configured to display on the screen a portion of the text and a corresponding subset of the media items that span a given time duration, and, in response to input from the user, to zoom to display a different portion of the text and a different subset of the media items that span a different time duration.

17. A computer software product, the product comprising a tangible non-transitory computer-readable medium in which program instructions are stored, which instructions, when read by a processor, cause the processor to receive from a user, a text that will serve as audio narration in a video clip, to automatically collect from one or more databases, responsive to the received text that will serve as audio narration in the video clip, a collection of media items to be selectively included in the video clip, to present to the user, on a graphic user interface (GUI), the received text that will serve as audio narration in the video clip and the collection of media items to be selectively included in the video clip, to receive from the user, through the GUI, instructions, which associate one or more selected media items from the automatically collected collection of media items, with corresponding elements of the received text, and to automatically generate the video clip, such that the selected media items appear in the video clip in the order of the corresponding elements in the received text and in synchronization with the corresponding elements of the received text in accordance with the instructions, which associate the one or more selected media items with corresponding elements of the received text.

* * * * *